United States Patent [19]

Penn

[11] Patent Number: 4,640,868
[45] Date of Patent: Feb. 3, 1987

[54] CLEAR, WEATHER RESISTANT ADHERENT COATING

[75] Inventor: Howard I. Penn, Skokie, Ill.

[73] Assignee: Morton Thiokol Inc., Chicago, Ill.

[21] Appl. No.: 828,468

[22] Filed: Feb. 10, 1986

[51] Int. Cl.$^4$ .............................................. B32B 9/04
[52] U.S. Cl. .................................. 428/446; 428/447; 428/450; 528/27; 528/28; 528/26; 528/33; 528/38
[58] Field of Search ..................... 528/27, 28, 26, 33, 528/38; 428/446, 447, 450

[56] References Cited

U.S. PATENT DOCUMENTS

| | | | |
|---|---|---|---|
| 3,432,488 | 3/1969 | Finkbeiner et al. | 260/212 |
| 3,646,089 | 2/1972 | Berger | 260/448.2 E |
| 3,707,521 | 12/1972 | DeSantis | 260/37 N |
| 3,779,794 | 12/1973 | DeSantis | 117/72 |
| 3,986,997 | 10/1976 | Clark | 260/29.2 M |
| 4,006,271 | 2/1977 | French et al. | 427/164 |
| 4,098,840 | 7/1978 | Yoshida et al. | 260/827 |
| 4,111,974 | 9/1978 | Mazour et al. | 260/448.8 R |
| 4,177,315 | 12/1979 | Ubersax | 428/336 |
| 4,243,605 | 1/1981 | Eisenhardt, Jr. et al. | 556/414 |
| 4,277,287 | 7/1981 | Frye | 106/287.12 |
| 4,288,586 | 9/1981 | Bock | 528/67 |
| 4,307,130 | 12/1981 | Roche | 428/336 |
| 4,337,205 | 6/1982 | Buder et al. | 260/349 |
| 4,369,300 | 1/1983 | Carter et al. | 528/28 |
| 4,374,237 | 4/1983 | Berger et al. | 528/28 |
| 4,386,167 | 5/1983 | Patton, Jr. et al. | 521/161 |
| 4,412,073 | 10/1983 | Robin | 528/52 |
| 4,472,464 | 9/1984 | Haluska et al. | 427/387 |
| 4,476,281 | 10/1984 | Vaughn, Jr. | 524/767 |
| 4,482,656 | 11/1984 | Nguyen et al. | 523/212 |
| 4,537,961 | 8/1985 | Robin | 528/52 |

FOREIGN PATENT DOCUMENTS 52-17519 9/1977 Japan.

OTHER PUBLICATIONS

Polyurethane Chemistry & Technology—Part I—Saunders, et al.—pp. 94–97.

*Primary Examiner*—Melvyn I. Marquis
*Attorney, Agent, or Firm*—George F. Wheeler; Gerald K. White

[57] ABSTRACT

A composition capable of providing, upon hydrolyzing and curing, a protective coating for substrates such as, for example, a plastic substrate having a vacuum metallized or vacuum sputtered surface comprises the reaction product of:

(a) an isocyanurate polyisocyanate having the following formula:

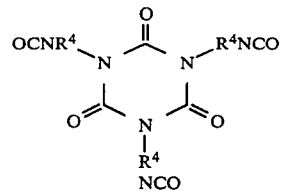

wherein $R^4$ is a substituted or unsubstituted aliphatic or cycloaliphatic group having from 1 to 12 carbon atoms or an aryl group and (b) an amino disilane having the formula:

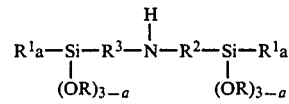

wherein R is a lower alkyl having 1 to about 6 carbon atoms; $R^1$ is a lower alkyl having 1 to about 4 carbon atoms; $R^2$ and $R^3$, which may be the same or different, are each substituted or unsubstituted alkylene radicals having 2 to 18 carbon atoms or arylene radicals having 6 to 18 carbon atoms; and a is an integer having values of 0 to 2, the protective coating adhering particularly well to such surfaces and having especially superior resistance to ultraviolet light, humidity, air and heat.

20 Claims, No Drawings

CLEAR, WEATHER RESISTANT ADHERENT COATING

BACKGROUND OF THE INVENTION

1. Field of the Invention

This invention relates generally to a protective coating composition, and more particularly to an abrasion-resistant, heat-resistant and weather resistant coating composition for metallized or nonmetallized surfaces. In particular, the present invention relates to a modified silicone resin composition which, when coated, for example, onto vacuum metallized or vacuum sputtered plastic surfaces, provides a transparent protective barrier to weathering forces.

2. Description of the Related Art

The commercial advent of solar concentrating devices that intensify solar radiation via parabolically curved or planar reflective surfaces has created interest in low cost, lightweight, weatherable, and durable plastic mirrors. Such mirrors or reflectors also are desired for other uses, for example, as reflectors for fluorescent lamps.

Such plastic mirrors can be produced by vacuum metallizing aluminum or some other metal onto a clear plastic film such as polyester, then applying via roll coating (gravure, reverse roll, etc.) a thin layer of a clear plastic solution, then force air drying for fifteen to sixty seconds at a relatively low temperature of approximately 125 degrees Centigrade. At the end of the drying period, the coated film is wound onto a roll, either with or without a protective slip sheet.

To implement the use of a plastic film reflective surface, the opposite (uncoated) surface may be subsequently coated with an adhesive thereby enabling the coated composite to be adhered to either a curved or flat metal surface or to be laminated to a second plastic film or surface.

The properties required in such a protective coating demand a material that, when coated and dried, will not block or even more stringently, will not optically mar when rolled up. The optical mar referred to can be any form of surface hazing, dulling, marring, or picking, each of which in varying degree, will diminish the reflectivity and particularly, the specular reflectivity of the surface. In addition, in the likely event that an adhesive will be applied to the opposite surface, it is of critical importance that the protective coating is capable of resisting the effects of heat and pressure as it will be in direct contact with the heated metal or plastic rolls of the coating machine. Therefore, a coating with deformation resistance to temperatures of 125° to 150° C. is necessary.

Thermoplastic acrylic resins, which do have good weathering properties, have been usefully employed for many years in coating metal surfaces. However, these resins soften too readily under the conditions described above, producing a reflective surface which is optically marred.

Also, the prior art is replete with a variety of compositions including a silicon-containing compound such as a silane and/or a polyisocyanate compound, which are described as being useful for coatings, sealants, lacquers and the like. These compositions are stated to impart properties including one or more of the following: clarity, adherency to various substrates, abrasion resistance, ultraviolet ray resistance, fogging resistance, resistance to moisture and humidity, weather resistance and resistance to discoloration by heat.

U.S. Pat. No. 4,006,271 to French, et al. thus discloses an abrasion-resistant adherent coating for polycarbonate substrates such as lenses. The coating contains a hydrolyzed $C_1$-$C_2$ alkyltri- (lower alkoxy) silane in a water-miscible organic solvent, an amino alkoxy silane contributing additional abrasion resistance and a stabilizing weak acid.

Japanese Patent No. 52-17519 to DeSantis discloses a sealing composition composed of a mixture of a solution of polyester resin in solvent, a reaction product of a polyisocyanate and a silane containing active hydrogen, a mixed isocyanurate polyisocyanate (prepared from TDI and MDI) and a catalyst.

U.S. Pat. No. 4,098,840 to Yoshida et al. discloses a thermosetting resin composition which forms a transparent, anti-fogging, abrasion resistant coating for the surfaces of inorganic glass, metals and synthetic resins. The composition comprises a hydrolysate of an alkoxysilane and a polymer or copolymer of certain monomers such as, for example, hydroxyethyl methacrylate or acrylate, U.S. Pat. No. 4,369,300 to Carter discloses a radiation curable coating. Acrylated urethane silicone compositions formed from the reaction of a silicone carbinol, a polyisocyanate and a hydroxyfunctional acrylate are disclosed.

U.S. Pat. No. 4,472,464 to Haluska et al. discloses the use of novel silanes in curable coatings. This allows such curable coatings, as a result, to be receptive to tinting or dyeing, after being cured on particular substrates.

U.S. Pat. No. 4,476,281 to Vaughn discloses a silicone resin coating which, when applied to solid substrates, forms a protective abrasion-resistant coating. The coating composition, prepared by hydrolyzing a methyl trimethoxy silane in an aqueous dispersion of colloidal silica, is described as adhering well to metals and metallized surfaces with resistance to moisture, humidity and ultraviolet light. Similar compositions are disclosed in U.S. Patent No. 3,986,997 to Clark, U.S. Pat. No. 4,177,315 to Ubersax, U.S. Pat. No. 4,277,287 to Frye, and U.S. Pat. No. 4,482,656 to Nguyen et al.

U.S. Pat. Nos. 3,707,521 and 3,779,794 to DeSantis disclose a polyurethane sealant-primer system comprising an isocyanate reactive surface primer composition and a moisture-curable polyurethane sealant composition.

U.S. Pat. No. 4,482,656 to Nguyen discloses a method for grafting a hydrolyzed alkoxy silane onto colloidal particles of silica or alumina, thereby transforming an inherently hydrophilic mineral surface into one which is hydrophobic. The grafted particles are then used in coatings to provide abrasion resistance.

U.S. Pat. No. 4,288,586 to Bock discloses the preparation of polyisocyanates containing isocyanurate groups by the partial trimerization of the isocyanate groups of isophorone diisocyanate (IPDI) using catalysts which accelerate the trimerization of isocyanate groups. The catalysts used are quaternary hydroxyalkyl ammonium hydroxides containing at least one hydroxyalkyl group. These polyisocyanates, unblocked or blocked by known techniques, may be used to prepare lacquer binders. The resulting lacquers give rise to films which are said to adhere surprisingly firmly to metal surfaces, are exceptionally light-fast, resistant to discoloration and highly abrasion resistant. In addition, it is stated that these lacquers are distinguished by great hardness, elasticity and chemical resistance, high gloss, excellent weather resistance and a good pigment affinity.

Curable isocyanate prepolymers, in which all or a portion of the available isocyanate terminal groups are reacted with a secondary amine containing silane monomer having two trialkoxy silane groups, are disclosed in U.S. Pat. No. 4,374,237 to Berger. Such prepolymers are useful to curable sealant compositions having enhanced wet adhesion combined with the desirable properties of polyurethanes, e.g.—tear resistance, extensibility and elastic recovery.

Despite all the prior work, the several compositions described fail to provide a composition which imparts the diverse properties required to serve as a desirable protective coating for metallized and sputtered substrates. There is accordingly a clear need to provide a composition satisfying the necessary properties for this type of application.

OBJECTS OF THE INVENTION

Accordingly, it is an object of the present invention to provide a protective coating having especially superior resistance to ultraviolet light, humidity, air, and heat.

Another object of the present invention provides a protective coating which is capable of adhering particularly well to both metallized and sputtered plastic substrates.

A further object of the present invention is to provide a coating which provides a protective layer for metallized surfaces.

It is yet another object of this invention to provide a protective coating, that when coated and dried, will not optically mar when rolled up.

Still another object is to provide a coating that can be easily cleaned, even after extended weathering.

A further object of this invention provides a coating composition especially well-suited for providing an optically clear coating surface on transparent surfaces.

These and other objects will become apparent to those skilled in the art from reading the following specification.

SUMMARY OF THE INVENTION

The present invention is, in general, predicated on the discovery that a curable composition suitable for providing a protective coating for metallized and sputtered substrates, such as various plastic surfaces, can be achieved by utilizing the reaction product of (1) an isocyanurate polyisocyanate having the following formula:

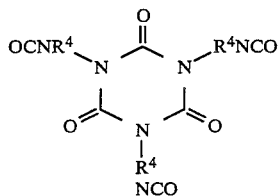

where $R_4$ represents a substituted or unsubstituted aliphatic or cycloaliphatic group having 1 to 12 carbon atoms or an aryl group, and (2) an amino disilane having the formula

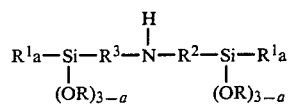

wherein R is a lower alkyl having 1 to about 6 carbon atoms; $R^1$ is a lower alkyl having 1 to about 4 carbon atoms; $R_2$ and $R_3$, which may be the same or different, are each substituted or unsubstituted alkylene radicals having 2 to 18 carbon atoms or arylene radicals having 6 to 18 carbon atoms; and a is an integer having values of 0 to 2. This reaction product, upon hydrolyzing and formulating with other optional ingredients, will form a desirable protective coating for metallized and sputtered substrates. More specifically, such protective coatings adhere particularly well to such substrates and impart superior resistance to ultraviolet light, humidity, air and heat. The coated substrates may be readily cleaned, even after extended weathering. Desirably, optically clear coatings can be provided.

DETAILED DESCRIPTION OF THE INVENTION

The curable composition of the present invention comprises the reaction product of two components, a cyclic trimer of an isocyanurate polyisocyanate and an amino disilane. Generally, any isocyanurate polyisocyanate whose preparation is not restricted by steric hinderance would be suitable.

The cyclic trimer is represented by the general formula:

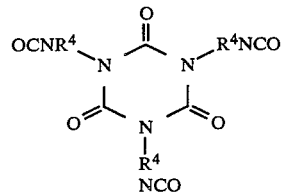

where $R_4$ represents a substituted or unsubstituted aliphatic or cycloaliphatic group having 1 to 12 carbon atoms or an aryl group.

The preferred cyclic trimer is prepared from isophorone diisocyanate. This trimer is commercially available as "IPDI T-1890" (HULS Chemische Werke). IPDI T-1890 is represented by the general formula of cyclic trimers wherein $R^4$ is an isophorone moiety. IPDI monomer has a molecular weight of 222.3 and a density at 20° C. of 1.058 g/ml.

Another suitable cyclic trimer is "Desmodur N3300" (Mobay Chemical Corp., Pittsburgh, Pa.). In the general formula, $R^4$ represents a hexamethylene moiety. Desmodur N-3300 has a specific gravity of 1.0g/ml at 20° C. and a vapor pressure of $7.5 \times 10^{-5}$ mmHg at 20° C. This yields, upon reaction with the disilane, a softer product than that obtained using IDPI T-1890.

As with most commercial raw materials, the commercially available cyclic trimers generally contain a minor portion of byproducts. In the present invention, the product is reacted on the basis of the NCO value furnished by the manufacturer.

Other organic polyisocyanates that may be employed to form suitable trimers include methylenediisocyanate, ethylenediisocyanate, the tri-, tetra-, penta-, hexa-, hepta-, octa-, nona-, and decamethylene-w,w¹-diisocyanates, 2-chlorotrimethylenediisocyanate, 2,3-dimethyltetra methylenediisocyanate, cyclohexane diisocyanate, meta-phenylene diisocyanate, paraphenylene diisocyanate, 2,4'-diphenylmethane diisocyanate, benzidine diisocyanate, naphthalene-1, 5-diisocyanate, 4,4'4''-triphenylmethane triisocyanate, decamethylene diisocyanate, poly phenylmethylene polyisocyanates that are produced by phosgenation of aniline/formaldehyde condensation products, dianisidine diisocyanate, xylylene diisocyanate, bis (2-isocyanatoethyl)-3 fumarate, bis (2-isocyanatoethyl) cyclohex-4-ene-1, 2-dicarboxylate, bis (2-isocyanatoethyl) carbonate, and many other organic polyisocyanates known in the art, such as those disclosed by Siefken, Annalen, 565, 122–135 (1949).

It will be generally preferred to utilize trimers derived from aliphatic and cycloaliphatic polyisocyanates, most preferably diisocyanates, since the resulting reaction product will provide protective coatings characterized by superior resistance to yellowing. For applications where yellowing resistance may not be a principal requirement, the use of trimers derived from aromatic polyisocyanates (most preferably diisocyanates) may also be employed.

It is, of course, necessary that the monomeric polyisocyanate employed be capable of being cyclically trimerized. Suitable trimerization techniques are known and may be utilized.

The other reaction component employed to form the curable compositions of this invention comprises an amino disilane represented by the formula:

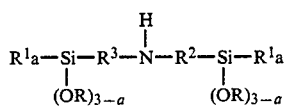

wherein R is a lower alkyl having 1 to about 6 carbon atoms; $R^1$ is a lower alkyl having 1 to about 4 carbon atoms; $R^2$ and $R^3$, which may be the same or different, are each substituted or unsubstituted alkylene radicals having 2 to 18 carbon atoms or arylene radicals having 6 to 18 carbon atoms; and a is an integer having values of 0 to 2. Exemplary substituents for $R^2$ and $R^3$ are ester and amide linkages.

It is preferred to utilize amino disilanes in which a in the formula herein is 1, and, more preferably, when a is 0. Stated differently, upon curing to provide the desired protective coating, the dialkoxy and trialkoxy amino disilanes will provide higher crosslinked densities than can be obtained with the monoalkoxy species, and thus impart more desirable abrasion resistance.

Illustrative of the most preferred species include the following amino disilane compounds:
N,N-bis[(3-trimethoxysilyl)propyl]amine;
N,N-bis[(3-triethoxysilyl)propyl]amine;
N,N-bis[(3-tripropoxysilyl)propyl]amine;
N-(3-trimethoxysilyl)propyl-3-[N-(3-trimethoxysilyl)-propylamino]propionamide;
N-(3-triethoxysilyl)propyl-3-[N-(3-triethoxysilyl)-propylamino]propionamide;
N-(3-trimethoxysilyl)propyl-3-[N-3-triethoxysilyl)-propylamino]propionamide;
3-trimethoxysilylpropyl-3-[N-(3-trimethoxysilyl)-propylamino]-2 methyl propionate;
3-triethoxysilylpropyl-3-[N-(3-triethoxysilyl)-propylamino]-2-methyl propionate;
3-trimethoxysilylpropyl-3-[N-(3-triethoxysilyl)-propylamino]-2-methyl propionate; and the like.

The preferred amino disilane is "Y9492" (Union Carbide Corporation). This is preferred because of the short chain length of the nitrogen-silicon bridging group. The performance of the protective coating obtained using this species is superior. The amino disilane and the cyclic trimer can be reacted using conditions known for the reaction of amino and isocyanato groups. Thus, the reaction proceeds satisfactorily at a temperature of from about 1° C. to about 150° C., preferably being carried out at a temperature from ambient to 100° C. The pressure may be varied as desired, and it is suitable to carry out the reaction under atmospheric pressure conditions.

To prevent moisture from entering the system, it will be generally desirable to carry out the reaction under an inert gas. Any inert gas may be employed, and nitrogen is an illustrative example.

Although the reaction is self-catalyzing, a conventional catalyst may be used. An illustrative example of a suitable catalyst is dibutyltin diacetate. For accuracy in handling, the catalyst may be dissolved in a suitable solvent. An illustrative example of a suitable catalyst/solvent system is dibutyltin diacetate in toluene. The amount of catalyst, if employed, may vary as is needed to satisfactorily catalyze the reaction. For example, it is suitable to use a catalyst at a concentration of from about 0.01% to about 10%, preferably from about 0.01% to about 1%, based upon the weight of the reactants.

A variety of useful catalysts, in addition to dibutyltin diacetate, are known and may be employed. Illustrative suitable catalysts include the stannous salts of carboxylic acids such as stannous octoate, stannous oleate, stannous acetate and stannous laurate; dialkyltin dicarboxylates such as dibutyltin dilaurate, dilauryltin diacetate, dibutyltin di(2-ethylhexanoate); dialkyltin oxides; trialkyltin oxides, tertiary amines; and tin mercaptides such as di-n-octyltin mercaptide.

It will generally be desirable to carry out the reaction with suitable mixing, as is known. A variety of useful stirring techniques are also known and may be employed.

It is preferred to utilize a stoichiometric ratio of the reactants. As will be discussed more fully hereinafter, the absence of an excessive amount of free NCO groups will provide a protective coating having maximum hardness, which hardness is particularly evident when utilizing the preferred amino disilanes. Thus, with the preferred amino disilanes, it is preferred to use a molar ratio of 3:1 (disilane/cyclic trimer). An excess of the amino disilane is likewise not preferred. This can adversely affect initial adhesion and also increase the water sensitivity.

However, while it is preferable to utilize a stoichiometric molar ratio, any ratio may be employed which provides a protective coating having the performance characteristics desired for the particular application. Indeed, for some applications, it may be preferable to use a molar ratio which results in a reaction product having some free NCO groups. More particularly, where the protective coating includes an optional ingredient such as a tinting dye that is reactive with NCO groups, it may be useful to utilize a molar ratio that provides a reaction product having sufficient free NCO groups to chemically incorporate such optional ingredient into the reaction product.

Further, molar ratios other than a stoichiometric one may be useful to provide a reaction product which is, in part, cured by moisture (viz.—by reaction of free NCO groups). Such reaction products may be useful in altering the viscosity or adhesion properties, as desired.

The thus-formed reaction product may be utilized as such to provide the protective coating, with or without various optional ingredients. More usefully, the reaction product will be diluted with a suitable solvent to provide a coating composition having the desired viscosity and solids content for the particular coating and curing technique to be used.

The viscosity and solids content of the protective coating may be varied as is needed for the particular application. The solids content may be reduced to the level desired by dilution with a suitable solvent in one or more steps. As an illustrative example, a solids content of 25% by weight is suitable.

Any of a wide variety of known solvents may be utilized. Anhydrous ethyl alcohol or methanol have been used to effectively control the viscosity. Other suitable alcohols include lower aliphatic alcohols such as propanol, isopropanol, n-butyl alcohol, t-butyl alcohol, isobutanol, and mixtures thereof. Optionally, ketones such as, for example, methyl ethyl ketone, can be used. Further, acetates such as ethyl acetate, isopropyl acetate and n-propyl acetate may employed.

Before or after dilution, and with or without formulation with optional ingredients, the reaction product may be stored or transported. However, as may be appreciated, the conditions employed should not result in excessive hydrolysis, as premature curing could result.

In addition to the reaction product of this invention, the protective coating may utilize any of a variety of optional ingredients known and employed for the particular application. As illustrative examples, useful optional ingredients include lubricants, ultraviolet absorbers, oxidation inhibitors, flow modifiers, antifoaming agents, monomeric crosslinkeable silanes, pigments, tinting dyes, and the like, all being employed in amounts effective to achieve the particular function of the optional ingredient being used.

If desired, the protective coating may be coated onto the substrate without further processing. In this situation, curing will occur in situ, upon exposure to moisture resulting in hydrolysis of the alkoxy groups present in the reaction product and subsequent condensation to form a network of siloxane linkages.

More preferably, the reaction product will be hydrolyzed before application to the substrate. A variety of techniques are known and may be employed. As an illustrative example, hydrolysis may be achieved in the presence of water and a suitable catalyst. Examples of suitable catalysts include organic acids such as acetic, propionic, butyric, citric, benzoic, formic, oxalic and the like. While the catalyst concentration is not critical, a level of from about one to three percent of the solids concentration is preferred.

The degree of hydrolysis is a function of both the water and the catalyst. Increasing the amount of water added to the intermediate increases the rate of the hydrolysis reaction. Also, the use of a catalyst increases the rate of the hydrolysis reaction. The hydrolysis reaction may be conducted at room temperature for as long as twenty-four hours or at elevated temperatures (115° F., i.e. $-46°$ C.) for several hours depending on the amount of catalyst used. Alkanol, a by-product of the hydrolysis reaction, is released during the reaction.

Hydrolysis will occur open incubation at a moderate temperature (e.g. $-45°$ C. or so) within a period of up to several hours.

After hydrolysis of the reaction product, the protective coating should be applied to the substrate before critical condensation occurs, which condensation may result in an excessive rise in viscosity Any of the several known techniques may be utilized to apply the coating. For example, the protective coating may be drawn down using a wire rod.

Curing to form the siloxane network is enhanced by the use of a suitable catalyst. Useful catalysts include those identified in conjunction with formation of the reaction product of this invention. As an example, a catalyst level of from about 0.2% to about 1.0 weight % catalyst, based upon the solids content, should be suitable. An illustrative example of a satisfactory catalyst is dibutyltin diacetate, conveniently introduced in a solvent such as toluene, isopropanol, or the like.

The coated surface can then be dried by a variety of methods which are known in the art. For example, it is suitable to dry the surface in a forced air dry-oven for one minute at 125° C. to a tack-free condition. Also, infra-red lamps may be used.

Useful substrates include a variety of metals or metal oxides deposited onto a plastic film or panel. As examples, vaporized or sputtered aluminum, gold, silver, stainless steel, titanium, indium-tin oxide, nickel-chrome and the like on a plastic substrate, such as, for example, a polyester film, can be usefully coated. The thickness of the film can typically vary from about a fraction of a mil to approximately 7 mils.

The resulting protective coating has superior resistance to ultraviolet light, humidity, air and heat. This coating likewise adheres particularly well to both metallized and sputtered substrates, such as plastic substrates and the like. Optically clear coatings are achieved when the cyclic trimer used in forming the reaction product of this invention is prepared with an aliphatic or cycloaliphatic polyisocyanate. Optimum abrasion resistance is achieved when the amino disilane employed is a trialkoxy species and stoichiometry is employed in preparing the reaction product. In this latter instance, because two —Si(OH)$_3$ groups are linked via hydrocarbon moieties to the same nitrogen atom, the siloxane network resulting from condensation is characterized by a high crosslinked density.

The protective coating of this invention is particularly well suited to the diverse requirements for coating plastic mirrors employed in solar concentrating devices. However, as may be appreciated, the protective coating of the present invention may be employed in any application where the properties imparted are desirable. For example, the resistance of the present coated plastic mirrors to heat, ultraviolet light, and abrasion makes them useful as reflectors for fluorescent lamps, and could substantially increase the amount of useful light delivered from the lamps.

The following Examples are intended to further illustrate the invention which is described herein and are not intended to limit the scope of the invention.

As used in the Examples, the following designation, symbols, terms and abbreviations have the following meanings:

"Des N 3300" denotes Desmodur 3300 from Mobay.

"Y 9492" denotes Union Carbide's Amino bis-alkoxy silane.

"MIBK" denotes methyl isobutylketone.

"MEK" denotes methyl ethyl ketone.
"IPDI" denotes isophorone diisocyanate.

Unless otherwise indicated, all parts and percentages in the following Examples are set forth on a weight basis.

EXAMPLE 1

This Example illustrates the formation of the coating composition of the present invention and its coating on a substrate.

130 grams of Des N 3300 (0.67 equivalents) and 0.3 grams of a 2% solution of dibutyl tin diacetate were added into a 500ml 3 necked flask. Under nitrogen, 228 grams of Silane Y9492 (0.67 equivalents) was slowly added. Reaction was exothermic, reaching a temperature of 85° C. Mixing was continued for two hours. The resulting reaction product was a clear and light yellow liquid.

A 25% solids content by weight product was then obtained by adding MIBK and anhydrous ethyl alcohol in the following proportions:

| | |
|---|---|
| Adduct (reaction product) | 25 |
| MIBK | 25 |
| Anhydrous Ethyl alcohol | 50 |

This diluted product was then hydrolyzed by utilizing the following formulation:

| | |
|---|---|
| 25% solids reaction product | 100 |
| Water | 16 |
| Acetic acid | 0.6 |

This was allowed to incubate for 3 hours at 115° F. (46° C.).

The protective coating was prepared by formulating as follows:

| | |
|---|---|
| Hydrolyzed 25% Solids Reaction Product | 100 |
| 2% Dibutyltin diacetate in toluol | 10 |

Onto an opaquely metallized (aluminum) 2-mil polyester film, using a #12 coating rod, the catalyzed protective coating composition was coated, followed by drying in a forced air draft oven for 1 minute at 125° C. The resulting coating was 2.5 microns thick, and the surface was tack-free.

To check adhesion, the coating was crosshatched with a razor (at 36 squares per square inch). To this area, a section of Scotch tape 610 was affixed and then peeled. The coating was not removed.

To check heat deformation resistance, a strip of the coated film was heat sealed (face-to-face) at 300° F., 30 lbs. pressure and 6 seconds dwell time. No seal or mar was noted at the interface.

To check the solvent resistance, the coated metallized film was held for 1 day at room temperature. A drop of acetone was placed on a strip of the coated film and covered with a watch glass for 1 minute. No softening or mar was noted.

A strip of this coated metallized film was placed in boiling water for 2 hours. The film remained bright and reflective with no loss of aluminum.

EXAMPLE 2

This Example illustrates the differences in the coating composition of the present invention and the coating prepared in Example 3 of U.S. Pat. No. 4,476,281.

The following solution was prepared, with mixing until the solution was clear:

| | |
|---|---|
| IPDI T-1890 (100% solids) | 65 |
| MEK | 35 |

Into a 3-necked, 500 ml. flask, 180 grams of such solution was added, together with 0.36 grams of a 2% solution of dibutyltin diacetate (in toluene).

With stirring and added slowly over 30 minutes, 162 grams of the Y9492 amino bis-silane was introduced. The reaction was exothermic, the temperature reaching 78° C. Infrared analysis indicated that no free NCO was present.

110 grams of anhydrous ethanol were added to bring the final solids to 58%. This diluted reaction product (hereinafter identified as "Solution B") had a Brookfield viscosity of 30 centipoises.

A coating composition precursor was then formulated as follows:

| | |
|---|---|
| Solution B | 43.2 |
| MIBK | 48.4 |
| Anhydrous ethanol | 28.4 |
| Water | 16 |
| Acetic Acid | 0.6 |

The solids content was 18.3%. This coating composition precursor was allowed to stand overnight at room temperature. 5 parts of a 2% solution of dibutyltin diacetate (in isopropanol) were added to 100 parts of the coating composition precursor to form the coating composition (hereinafter designated as "Invention Coating Composition").

For purposes of comparison, a coating was prepared according to Example 3 of U.S. Pat. No. 4,476,281. This coating is a siloxy-based material intended for use on plastic surfaces. The coating was catalyzed with tetramethyl ammonium acetate (the catalyzed coating hereinafter being designated as "Reference Coating").

Using a number 18 wire wound rod, the Invention Coating Composition and the Reference Coating were deposited at approximately 5 gms/sq meter onto the following substrates:

(1) Opaquely deposited (vaporized) aluminum on 2 mil polyester film (supplied by Martin processing);

(2) Translucent sputtered stainless steel on 2 mil polyester film (supplied by Deposition technology);

(3) Translucent sputtered titanium on 2 mil polyester film (supplied by Deposition technology).

Each coated film was then cured for one minute at 125° C. in a forced air draft oven. Adhesion of the coating to each of the coated substrates was then tested by cross hatching the coating with 36 squares per square inch. Scotch tape was then adhered to each cross batched coating and then peeled off. The results are set forth in Table I:

TABLE I

| | On Aluminum Metallized Polyester | On Stainless Steel Sputtered Polyester | On Titanium Sputtered Polyester |
|---|---|---|---|
| Invention Coating Composition | | | |
| Immediately After Cure | No Removal Of Coating | No Removal Of Coating | No Removal Of Coating |
| After 3 Days At Room Temp. | No Removal Of Coating | No Removal Of Coating | No Removal Of Coating |
| Reference Coating | | | |
| Immediately After Cure | No Removal Of Coating | Coating Completely Removed | Coating Completely Removed |
| After 3 Days At Room Temp. | No Removal Of Coating | Coating Completely Removed | Coating Completely Removed |

Coated aluminum metallized polyester films of both the Invention Coating Composition and the Reference Coating, both displaying good adhesion, were tested for humidity resistance by aging while being suspended horizontally in a chamber held at 110° F. and 100% R.H. After 1 day, the Reference Coating suffered a complete loss of aluminum, becoming transparent, thereby destroying any utility as a reflective coating. The Invention Coating Composition after 2 weeks exposure remained unchanged, being still bright and reflective.

Panels of aluminized polyester film coated with the Invention Coating Composition and the Reference Coating were tested for ultraviolet and humidity resistance by placing in a Q.U.V. (Q-panel Co.) weathering chamber, using an alternating cycle of 4 hours of ultraviolet exposure at 60° C. and 4 hours of condensing water at 50° C. After 100 hours, the panel with the Reference Coating was completely transparent. After 500 hours, the panel with the Invention Coating Composition was unchanged, still bright and reflective.

The reaction of the panels with the coated surfaces to deformation under heat and pressure was also tested. An additional coated panel (on opaquely aluminized polyester) was prepared using a solution of a thermoplastic acrylic resin of high glass transition temperature (Acryloid A-21 with a Tg of 105° C.) (this coated panel being hereinafter designated as "Reference Coating B"). Strips of each of the three coated panels were sealed face to face at 30 lb. pressure and 200° F. (93° C.) and then 300° F. (149° C.) using a standard Sentinel Heat Sealer for six seconds dwell time. The sealed area was inspected for evidence of both softening and/or fusion of the two surfaces. The results are set forth in Table II:

TABLE II

| | Invention Coating Composition | Reference Coating | Reference Coating B |
|---|---|---|---|
| 200° F. (93° C.) | Intact (no seal) | Intact (no seal) | Partial seal resulting in complete disruption of coating |
| 300° F. (149° C.) | Intact | Intact | — |

EXAMPLE 3

This Example illustrates the utility of the coating composition of the present invention when employed as a topcoating over a thermoplastic acrylic. U.S. Pat. No. 4,307,150 to Roche discloses a solar reflector having an acrylate-containing protective layer. Also, this Example demonstrates the ability of the coating composition of this invention to maintain the smooth finish necessary to a reflective surface. As is demonstrated, wind conditions carrying debris do visibly affect the surface quality.

Two coating compositions were prepared, formulated as set forth hereinafter:

| Coating 1 | | Coating 2 |
|---|---|---|
| Elvacite 2014 | 20 | Invention Coating Composition |
| Toluol | 40 | prepared as in Example 2 and |
| Ethyl Acetate | 40 | diluted to 25% solids with: |
| | | MEK - 100 and Tinuvin 292 - 0.5 |

Using a #22 wire wound rod, a base coat of Coating 1 was applied to a 9"×11" opaquely metallized (aluminum) 2 mil polyester film and dried in a forced draft oven at 120° C. for 20 seconds. The dried coating thickness was 6 microns. With a #8 rod, a thin topcoat layer of Coating 2 was applied over the bottom half of the base coat to a coating thickness of 2 microns.

After a post cure of 2 days at room temperature, the coated film was exposed out-of-doors on the roof at a 45° angle and facing southwest from which direction a good deal of the prevailing winds originated. After two months, the film was wiped gently with water and inspected. The upper half of the coated film (Elvacite coated) appeared slightly abraded and dull. The bottom half (Elvacite plus topcoat) was glossy and reflective.

A 3×6 inch section of the above-weathered film (cut so as to contain both upper and lower areas) was placed in a Q.U.V. weathering chamber. Using a cycle of 4 hours ultraviolet exposure alternating with 4 hours of condensing water, the film was weathered for 2,000 hours. Inspection of the upper half showed a pronounced loss of aluminum and complete loss of mirror quality (reflectivity). The lower half (Elvacite plus topcoat) remained reflective and glossy.

The remainder of the coated film was returned to the roof and weathered for eleven more months. After cleaning the surface with water, inspection revealed the upper half (Elvacite coated) to be dull and heavily abraded with small scratches. The bottom half (Elvacite plus topcoat) was smooth, free of scratches and reflective.

I claim:

1. A composition, upon hydrolysis and curing, providing a protective coating comprising the reaction product of:

(a) an isocyanurate polyisocyanate having the following formula:

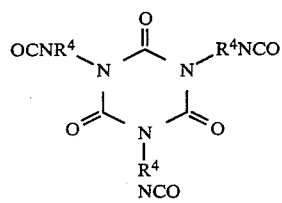

wherein $R_4$ is a substituted or unsubstituted aliphatic or cycloaliphatic group having from 1 to 12 carbon atoms or an aryl group, and (b) an amino disilane having the formula:

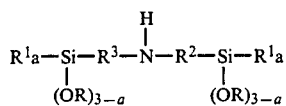

wherein R is a lower alkyl having 1 to about 6 carbon atoms; $R^1$ is a lower alkyl having 1 to about 4 carbon atoms; $R^2$ and $R^3$, which may be the same or different, are each substituted or unsubstituted alkylene radicals having 2 to 18 carbon atoms or arylene radicals having 6 to 18 carbon atoms; and a is an integer having values of 0 to 2.

2. The composition of claim 1 wherein $R^4$ is an isophorone moiety.

3. The composition of claim 1 wherein $R^4$ is a hexamethylene moiety.

4. The composition of claim 1 wherein a is zero.

5. The composition of claim 1 wherein R is methyl.

6. The composition of claim 1 wherein R is methyl, $R^2$ and $R^3$ are propyl and a is zero.

7. The composition of claim 1 wherein the isocyanurate polyisocyanate and the amino disilane are reacted in essentially a stoichiometric molar ratio.

8. A coated member comprising (a) a substrate and (b) a protective coating on said substrate comprising the hydrolyzed and cured composition of claim 1.

9. The coated member of claim 8 wherein the substrate comprises a plastic member having a vacuum metallized or vacuum sputtered surface.

10. The coated member of claim 9 wherein the vacuum metallized surface is opaquely deposited (vaporized) aluminum.

11. The coated member of claim 9 wherein the vacuum sputtered surface is translucent sputtered stainless steel.

12. The coated member of claim 9 wherein the vacuum sputtered surface is translucent sputtered titanium.

13. The coated member of claim 8 wherein $R^4$ is an isophorone moiety.

14. The coated member of claim 8 wherein $R^4$ is a hexamethylene moiety.

15. The coated member of claim 8 wherein a is zero.

16. The coated member of claim 8 wherein R is methyl.

17. The coated member of claim 8 wherein R is methyl, $R^2$ and $R^3$ are propyl and a is zero.

18. The coated member of claim 8 wherein the isocyanate polyisocyanate and the amino disilane are reacted in essentially a stoichiometric molar ratio.

19. The coated member of claim 9 wherein the vacuum sputtered surface is indium-tin oxide.

20. A reflector for increasing the amount of useful light delivered from a fluorescent lamp, comprising the coated member of claim 9.

* * * * *